Feb. 27, 1940.                C. W. HANSELL ET AL                2,192,062
                                  ELECTRIC CONDENSER
                        Original Filed June 21, 1935    4 Sheets—Sheet 1
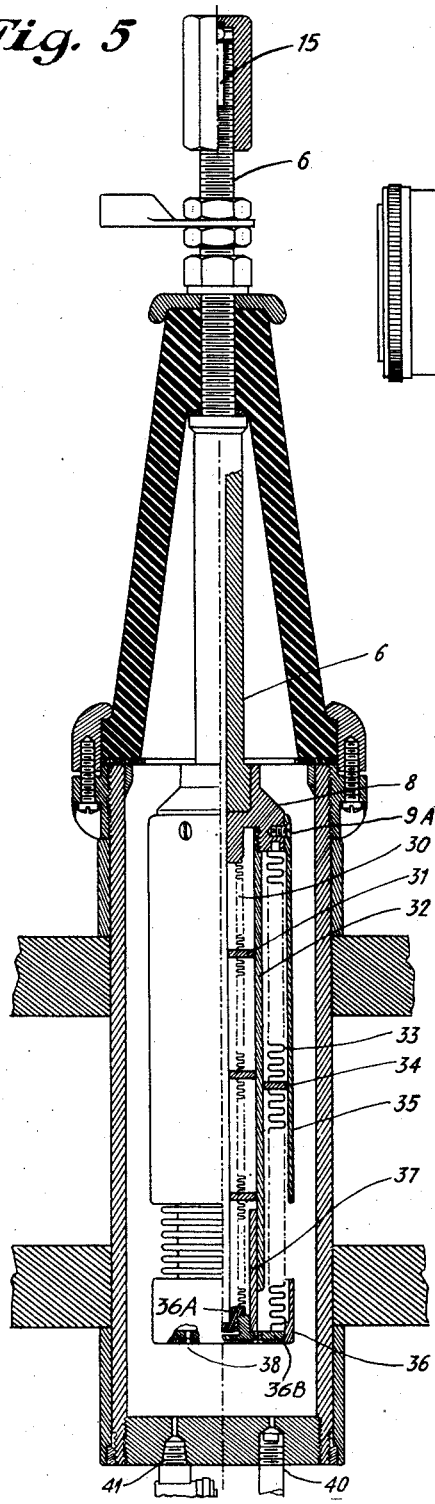
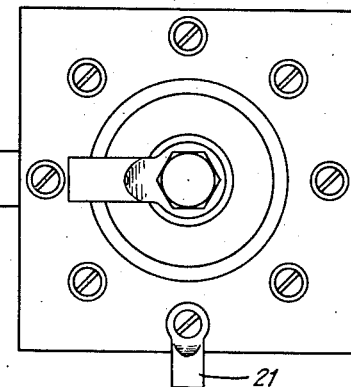
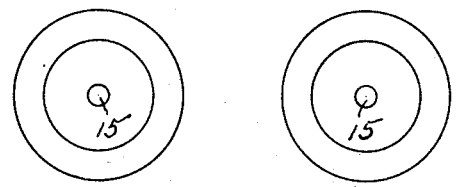
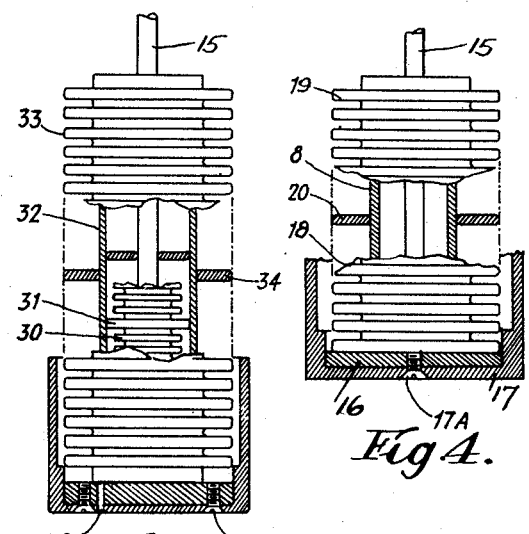
INVENTORS
C. W. HANSELL
G. L. USSELMAN
C. W. LATIMER
BY
ATTORNEY Feb. 27, 1940.  C. W. HANSELL ET AL  2,192,062
ELECTRIC CONDENSER
Original Filed June 21, 1935   4 Sheets-Sheet 2

INVENTORS
C. W. HANSELL
G. L. USSELMAN
C. W. LATIMER
BY
H. S. Srover
ATTORNEY

Feb. 27, 1940.    C. W. HANSELL ET AL    2,192,062
ELECTRIC CONDENSER
Original Filed June 21, 1935    4 Sheets—Sheet 3

INVENTORS
C. W. HANSELL
G. L. USSELMAN
C. W. LATIMER
BY
ATTORNEY

Feb. 27, 1940. C. W. HANSELL ET AL 2,192,062
ELECTRIC CONDENSER
Original Filed June 21, 1935 4 Sheets-Sheet 4

INVENTORS
C. W. HANSELL
G. L. USSELMAN
C. W. LATIMER
BY
ATTORNEY

Patented Feb. 27, 1940

2,192,062

UNITED STATES PATENT OFFICE 2,192,062

ELECTRIC CONDENSER

Clarence Weston Hansell, Port Jefferson, and George Lindley Usselman, Rocky Point, N. Y., and Chester Willson Latimer, West Orange, N. J., assignors to Radio Corporation of America, a corporation of Delaware Application June 21, 1935, Serial No. 27,678
Renewed December 1, 1938

28 Claims. (Cl. 175—41.5)

This invention relates to an improved electric condenser, and is particularly adapted to use in a short wave transmitter.

An object of this invention is to simplify and improve a condenser of the compressed fluid type;

Another object of this invention is to provide a compressed air condenser having an internal electrode which has an adjustable portion;

A feature of this invention is to provide a reliable adjustable condenser of comparatively small dimensions having a relatively large safety factor with regard to the voltage breakdown.

Another feature of this invention is to provide a rugged condenser structure which is capable of being placed in a short wave transmitter circuit and having external means for altering the capacity after the condenser is placed in the transmitting circuit.

Another object of this invention is to provide a condenser which matches, as nearly as is practical, the physical dimensions and the electrical characteristics of a vacuum tube used in the same short wave or neutralizing circuit so that the capacity and lead inductance of the tube and that of the condenser substantially balance or neutralize the coupling between the input and output circuit of an amplifier over a large range of frequencies.

Still another feature of this invention is the arrangement of the flexible parts between the fixed and adjustable portions of the inner electrode so that all electrical sliding contacts are carefully avoided, as such sliding contacts frequently cause trouble in operation due to arcing between surfaces in close contact or changes in the surface contact resistance which would result in noisy signals and unreliable neutralizing adjustment.

Another feature of this invention is the employment of various lengths and or diameter of sleeves fitting snugly to the inside of the outer electrode, which change the capacity of the condenser.

Another feature of this invention is the new and improved arrangement whereby the adjustable portion of the inner electrode is externally adjusted.

Still another feature of this invention is the arrangement of the component parts such as a rugged casing which has a large cross-sectional area thus preventing a rapid temperature change. Also the casing is provided with a hollow cone-like insulator, the central portion being hollowed out to cut down dielectric losses and to improve the electrical creepage from the outer casing to the inner electrode.

The condenser of this invention is based upon the broad idea of employing compressed fluid as a dielectric, and while it is true that such condensers are old in the prior art, such as for example the Fessenden Patent No. 793,777, the condensers of the prior art are not capable of efficient operation on the shorter wave lengths or higher frequencies. Furthermore, the condensers of the prior art could not be employed to withstand the higher pressure when one of the electrodes is made variable. This condenser was conceived to overcome the difficulties encountered when using compressed fluid condensers in the higher frequency circuits. Likewise, it is desirable, when using compressed fluid condensers in a short wave neutralizing circuit, to provide some form of sensitive and accurate external adjustment of at least a portion of one of the electrodes without disturbing the general assemblage of the unit. The adjustment of a portion of one of the electrodes is accomplished by having the central electrode composed of several elements which are provided with a flexible metallic electrical circuit conducting means for changing a portion of the surface area of the inside electrode with respect to the other electrode, thus shielding and eliminating all sliding electrical or radio frequency contacts.

This invention will be more completely understood by referring to the accompanying drawings, in which Fig. 1 is a plan view of the condenser of this invention having a single flexible electrode;

Fig. 4 is a detailed section showing of the adjusting members of the single-walled central inner electrode;

Fig. 4a is a plan view of Fig. 4;

Fig. 5 is a sectional view of a condenser having a double flexible wall for the inner adjustable electrode;

Fig. 6 is a detailed section showing of the adjusting members of the double flexible wall for the inner electrode;

Fig. 6a is a plan view of Fig. 6;

Figure 2:
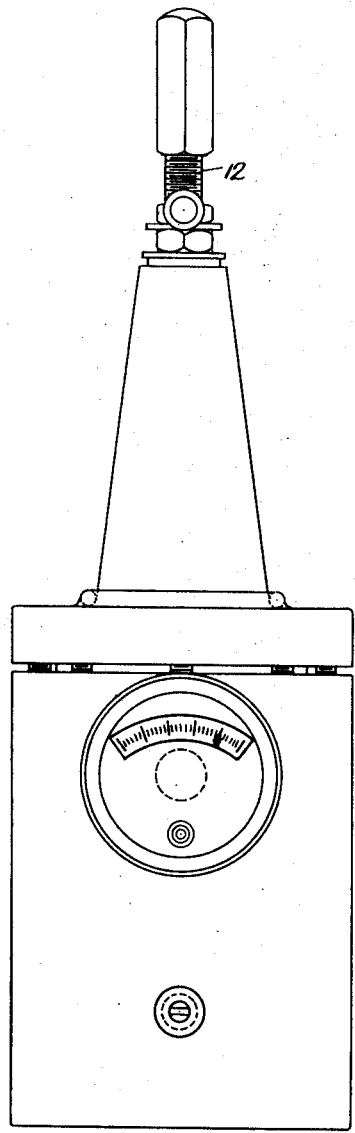
Fig. 2 is an elevation of Fig. 1.

Referring now in detail to Figs. 1, 2, 3, and 4, the outer electrode or condenser casing 1 is composed of any good conducting metal, such as, for example, copper. It will be noted that the cross-sectional area of the casing is substantially greater than the internal aperture 1A, this internal aperture or bore 1A being accurately finished and polished so as to provide a suitable electrode surface. The upper portion of the casing 1 is provided with a cone-like insulator 2 which is composed of a good insulating material, such as "Isolantite", porcelain, "Pyrex", or any suitable material having the necessary and requisite mechanical strength and insulating qualities. The lower end of the insulator 2 is provided with an enlarged section 2A over which a metallic ring 3 securely fastens the insulator to the casing 1 by suitable screws 4. To provide a gas-tight seal and to prevent breakage of the insulator, a lead gasket or any other suitable gasket material 5 is employed between members 1, 2, and 3. The member 4 is provided with a ridge 4A which acts as a corona shield to prevent the insulator from arcing over due to the high voltage. Within the central portion of insulator 2 a long hollow stem 6 is located, the lower portion being provided with threads 7 to secure the guide 8 for securing and guiding the main or fixed portion of the inner electrode 9. The electrode 9 is arranged to be removable by means of screws 9A so that it may be interchanged with other electrode members of different lengths and diameters, so that the capacity of the fixed portion of the condenser may be easily changed as required.

A shoulder 10 retains stem 6 against the shoulder gasket 11 within the insulator 2. The upper portion of stem 6 is threaded with a fine thread 12, by means of which the adjustable lower portion of the central electrode is raised or lowered within the aperture 1A, respectively, with the aid of and against the internal fluid pressure by means of a relatively long adjusting nut 13. The adjustable portion of the central electrode is maintained in the desired position by means of the internal fluid pressure always acting upon and forcing the central electrode adjustable assembly up against the lower portion of a rod 15. The upper portion of adjusting nut 13 is arranged to retain a small hardened steel ball-bearing 14 which actuates a metallic rod 15 that passed through the stem 6, and terminating in a follower 16 upon which is mounted the adjustable lower portion 17 of the inner electrode 9. The lengths of the push rod 15 and stem 6 is made such that the downward movement of the bellows is limited by the inner portion of nut 13 striking and stopping on the top end of stem 6. Or, in other words, the longer the rod is, a greater movement can be obtained. This prevents the bellows from being damaged by stretching. It also limits the reduction of dielectric thickness at the lower end of the bellows so that the condenser will not arc over or short-circuit. This lower adjustable portion 17 is likewise arranged to be easily removable by means of screw 17A so that it may also be interchanged with other members of different length and diameter. In order to provide a sensitive and accurate adjustment between the inner and outer electrodes, a novel arrangement is shown in detail by Fig. 4, wherein metallic flexible bellows 18 and 19 are employed which are united together by an interposed suitable ring-like floating guide-washer 20, the lower bellows 18 being soldered to the lower portion or underside of the ring-like washer 20 and the flange portion of follower 16. The upper bellows 19 is soldered to the upper underside flange portion of guide member 8 and also the top side of ring-like guide washer 20. The floating guide member 20 keeps the bellows 18 and 19 from bowing out of line by sliding up and down the outside wall of guide 8. To prevent member 20 from binding, the inner and outer periphery is rounded over.

The outer casing 1 ordinarily acts as the outer electrode and is an integral part of the circuit assembly, or it may be provided with a terminal or lug 21, the central electrode being also provided with a terminal lug 22 which is retained in place by means of nuts 23. The lower nut 23 also acts to retain the stem 6 in place within the insulator by being tightly clamped against the brass washer 24 and the lead washer or gasket 25.

The casing 1 is provided with an air valve 26 and a cap 27, the valve 26 being securely soldered to casing 1 at a point 28 to prevent leakage. In order that the fluid, which may be air, gas, or a compressed liquid, under pressure within the casing may be accurately determined, a pressure gauge 29 is provided, it having a scale usually indicating from zero to 300 pounds pressure. This particular condenser is adapted for use with U. V. 846 transmitting tubes and in normal circuit operation will contain gas or air under pressure at substantially 150 to 200 pounds. Such a condenser at this pressure would be capable of efficiently handling approximately 30,000 volts R. M. S. When it is desirable to use this new and novel condenser in a neutralizing circuit, the adjustable portion 17 of the central electrode 8 is placed in a midway or average position and to further adjust the capacity of the condenser the surface area and/or dielectric thickness is changed by moving the adjusting nut clockwise or counter-clockwise. When the adjusting nut 13 is moved clockwise, it being assumed that stem 6 has a right hand thread the members 16 and 17 will be pushed downward by rod 15 to increase the active capacity by decreasing the dielectric thickness of the condenser fluid. Similarly, when the adjusting nut 13 is moved in a counter-clockwise direction, members 16 and 17 will telescope upward within member 9 and thus decrease the active capacity between its lower surface and the bottom surface of aperture 1A by increasing the dielectric thickness of the condenser fluid, the changes in position of adjustable electrode 17 is assisted by the fluid pressure acting between the base portion of aperture 1A and the underside of electrode 17.

Figure 3:
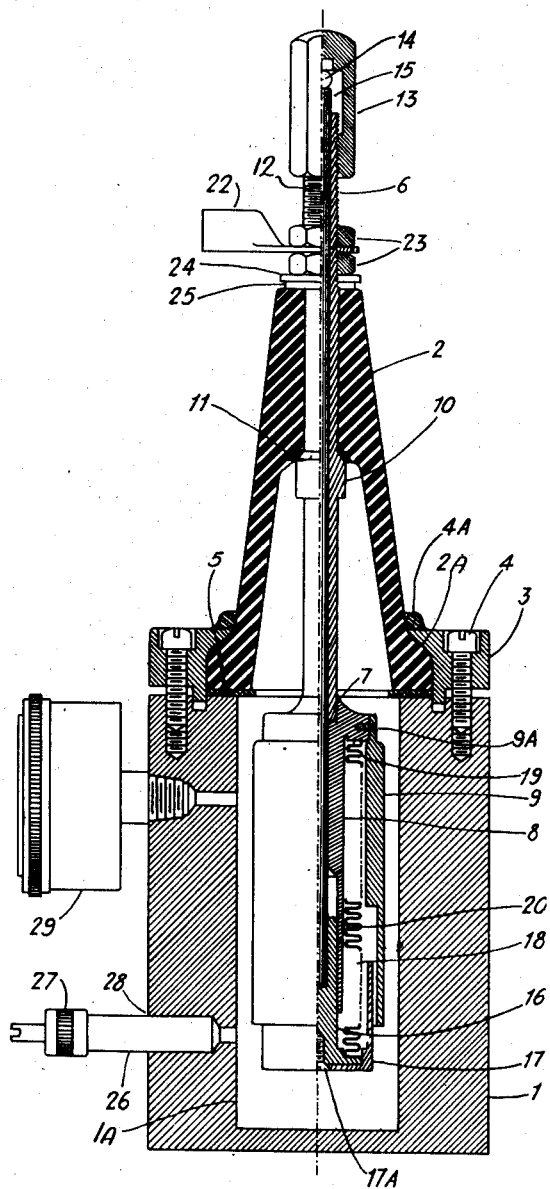
Fig. 3 is a sectional view of Figs. 1 and 2.

The modification shown by Figs. 5 and 6 is, in general, similar to Figs. 1 and 3, respectively, except that the flexible portion of the adjustable electrode is in the form of a double-walled arrangement. The reason for constructing this condenser with a double-walled flexible bellows is that when a large condenser carrying relatively large current is required it is not practical to employ a single large bellows which will have the desired flexibility capable of standing the high pressure, and still permit the adjusting movement of the variable portion of the inner electrode and also retain the feature of no sliding electrical contact between adjustable elements of the central electrode. However, it is practical to make a small metallic bellows having a mean diameter of substantially ¾ inch which will stand the high pressure and is capable of having good flexibility with pressures up to 200 pounds per square inch. It is then possible to employ a larger metallic bellows having a mean diameter substantially greater than the inner bellows, for example, two inches or larger surrounding the smaller bellows, by providing suitable fluid communication with the inner bellows so that the normal pressure on both sides of the outer bellows will be substantially the same. The smaller bellows is indicated by the numeral 30, and, in this modification, is divided into four parts by three suitable ring-like washers 31 to prevent bowing of the bellows, the number of washers being determined by the length of the inner electrode and also the amount of adjustment required to the variable portion of the inner adjustable electrode. Surrounding the inner bellows and secured to the upper portion of guide member 8 is a tube-like element 32 upon which the ring-like guide members 31 slide in operative engagement. Outside the member 32 are located two larger or outer bellows 33 which are divided in the center by another group of ring-like washers 34. Surrounding the larger bellows 33 is the main fixed portion of the inner electrode 35 which is likewise secured to member 8. The variable portion 36 of inner electrode 35 is guided and slides within member 32 by a telescoping tubular member 37. The inner and outer bellows are fastened to bushings 36A and 36B which are secured to member 36. In order that there may be fluid communication between the inner and outer bellows as mentioned above, member 36 is provided with three small apertures 38. The inner bellows 30 is arranged to withstand the air pressure of the condenser and acts as an air seal by being soldered to members 8, 31 and 36A. The outer bellows 33 has equal pressure on both sides and carries substantially all the radio-frequency current of the condenser from the fixed portion 8 and 35 of the inner electrode to the adjustable portion 36; whereas the inner bellows carries practically no radio frequency current. The casing 1 is provided with a similar air valve 26 and cap 27 as in the type shown by Figs. 1, 2 and 3, except that the valve 26 is soldered to the end of the casing 1 at point 40, the pressure gauge 29 being also located at the end of casing 1 at point 41.

The adjustment of the above-mentioned modification is accomplished in a manner similar to the adjustment of the single-walled flexible electrode, mentioned above, by turning the adjusting nut 13.

Figure 7:
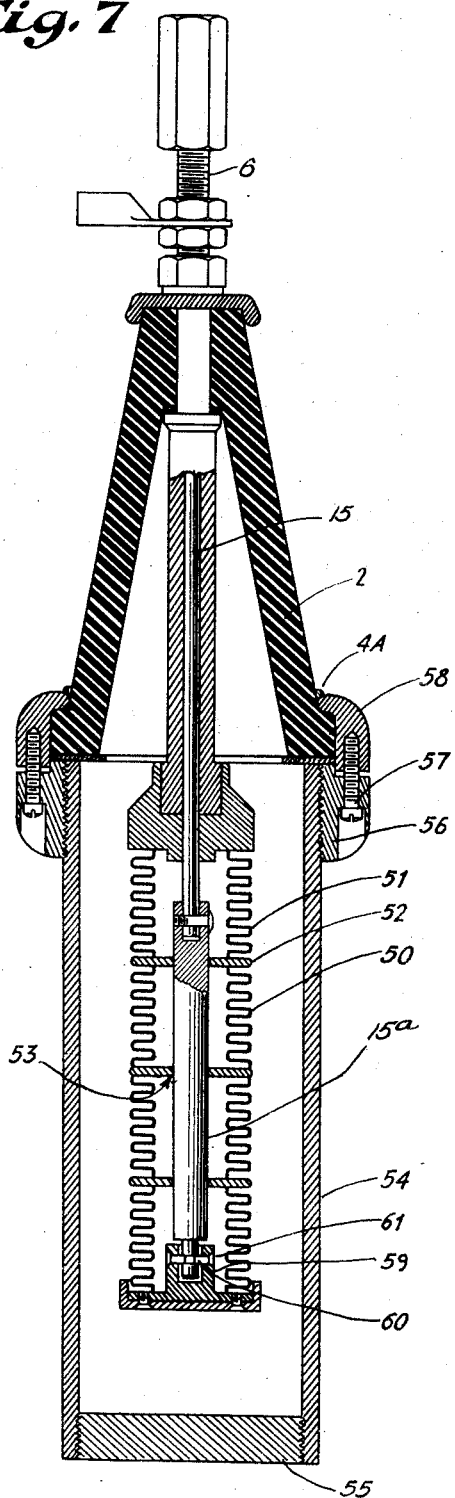
Fig. 7 is a sectional view of a simple modification of this invention, wherein the adjustable electrode is a flexible member.

In the modification shown in Fig. 7, a simplified form of this invention is that of a central electrode 50 made up from a plurality of flexible adjustable metallic bellows 51, the bellows being divided by three guide washers 52 which keep the bellows 51 in line and prevent bowing of the entire inner electrode structure by having the aperture in washers 52 rounded over at a point 53 to provide a smooth sliding contact between the guide washers and the lower adjusting rod 15a. The adjusting rod 15a is secured to the upper adjusting rod 15 by a screw 15b. In this modification there is not shown any pressure gauge or valve as it is proposed to use only air as a dielectric, although the condenser can be equipped with the necessary apparatus for converting it into a compressed air condenser.

The remaining features of this modification are similar to those described in Figs. 1, 2, 3, and 4, except that the outer electrode is made up of a tube 54 which is provided with an end plug 55 and a threaded rim 56 which is provided with securing screws 57 for retaining the insulator 2 by means of a clamp ring 58. Likewise, in order that the lower portion 59 of the inner electrode will follow the adjusting rod 15, the latter-mentioned rod is provided with a slot or groove 60 in which guide screws 61 are provided. The adjustment of the inner electrode is made in a similar manner to that mentioned above for the modification shown in Figs. 1 to 6, inclusive.

Figure 8:
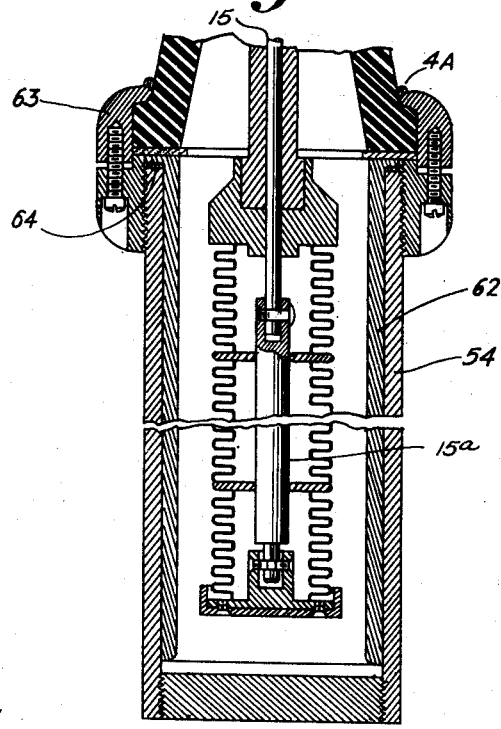
Fig. 8 is a section showing a modification similar to Fig. 7 having a removable sleeve for the outer electrode to also change the capacity of the condenser.

The modification indicated by Fig. 8 is in general similar to that shown in Fig. 7, except that the outer electrode 54 is provided with a removable sleeve 62 which terminates at the upper end in a contact flange 63 in which intimate contact between members 54 and 62 is provided by a suitable spring member 64. This particular feature provides the interchanging of various length or diameter sleeves which snugly fit the inside of the outer electrode so as to accomplish a change in the condenser capacity without changing the major elements of the condenser to provide for its use with vacuum tubes of slightly different electrical characteristics. The inner electrode is adjusted in a similar manner to the modification shown in Fig. 7 mentioned above.

Figure 9:
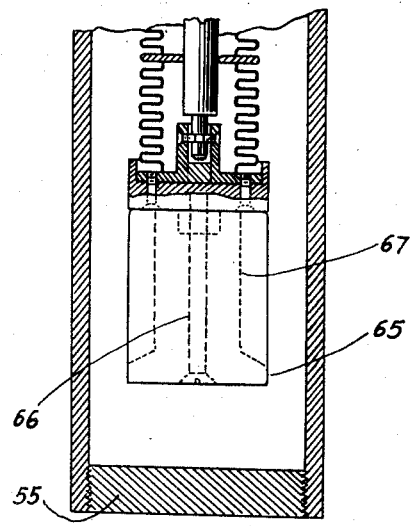
Fig. 9 is a modification of Fig. 7, showing the addition of a solid removable electrode fixed to the end of the flexible member.

Fig. 9 indicates another arrangement similar to that of Fig. 7, except that the lower portion of the central electrode is provided with a removable plug 65 secured by means of a screw 66, the plug 65 being interchangeable with plugs of different diameters and length, or if desired may be turned down, or a portion of its length and diameter may be turned down, as indicated by the dotted line 67.

Figure 10:
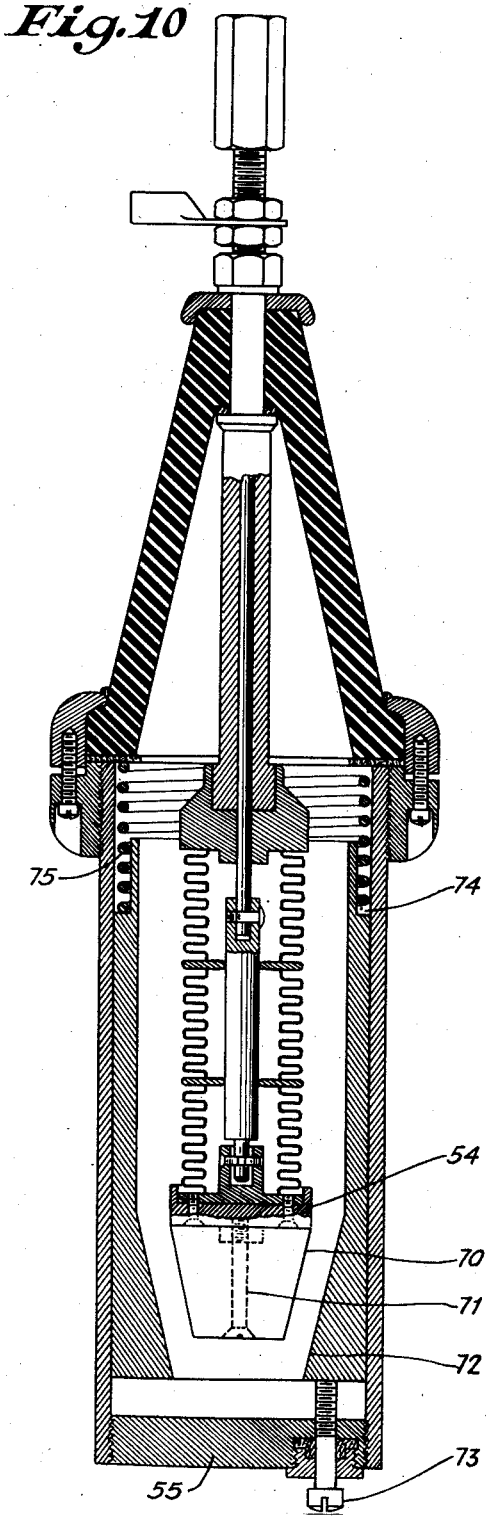
Fig. 10 is a modification showing the combined features of Figs. 8 and 9.

Fig. 10 is a modification combining the features of Figs. 7 and 8, wherein both the inner and outer electrodes are arranged to be externally adjusted. This is accomplished by providing the lower portion of the inner electrode with a tapered plug 70 which is secured to the lower portion of the inner electrode by means of a screw 71.

The telescoping sleeve within the outer electrode 54 is provided with a tapered portion 72, the taper being at an angle similar to that of plug 70. External adjustment is made by turning the screw 73 which is provided with a gland or stuffing box to form a gas seal in the end plug 55. In order that the tapered telescoping sleeve may be secured in intimate contact and its adjustment accurately maintained, the upper portion of the telescoping sleeve is provided with a turned-down portion 74 in which there is guided a helical spring 75.

Figure 11:
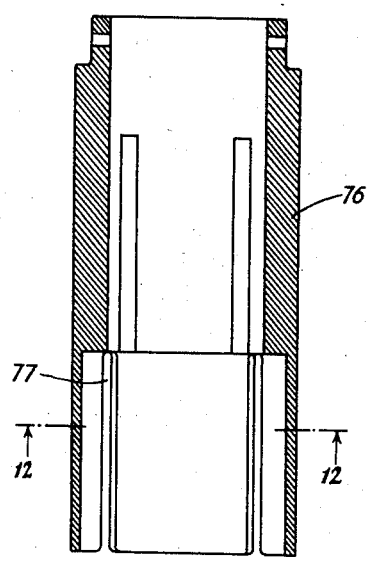
Fig. 11 is a sectional detail of an improved removable sleeve for the outer electrode.
Figure 12:
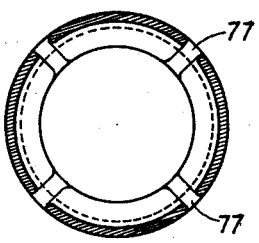
Fig. 12 is a cross-sectional view taken on lines 12—12 of Fig. 11.

Figs. 11 and 12 show a detail of an improved inner electrode skirt 76, which is in general similar to that of the skirt 9 shown in Figs. 3 and 5, except there is provided a plurality of slots 77 to allow the radio frequency current to flow through the inside of the skirt on the surface of the slots or any similar openings, thereby shortening the high-frequency current path which normally flows on the outer surface.

A brief outline of the advantages of compressed air condensers of this invention over that of condensers known in the prior art is as follows:

1. The required volume of compressed air condensers of a given rating may be a small fraction of that required for open air condensers. Its small size often makes it possible to reduce the size and cost of the whole system, for example, a radio transmitter or amplifier apparatus assembly, which in turn reduces the size and cost of enclosures, etc. The reduced dimensions often will be an aid to obtaining higher frequencies and greater band widths.

2. Compressed air condensers are completely protected internally from dirt, flys and insects which almost always cause some flash-over of open air condensers, frequently with disastrous effects on tubes and circuits. The effects were found to be so serious in short wave transmitters that series mica blocking condensers had to be added to save tubes and circuits even though their presence was undesirable from the standpoint of high frequency apparatus design.

3. Compressed air condensers have been found to be entirely free from the "Rocky Point Effect." Cosmic ray bursts, loose particles, etc., cannot cause an unstable secondary emission of gas and vapor which causes flash-over. The presence of compressed air prevents any loose electrons or ions acquiring velocities high enough to cause secondary electron or ionic emission resulting in flash-over.

4. A compressed air condenser is shown by practical experience to be improved in breakdown voltage limit as a result of flash-over of ordinary intensity, met with in radio transmitters, whereas a vacuum condenser is destroyed by a single flash-over due to impaired vacuum. In fact, it has been common practice since Fessenden began building compressed air condensers, years ago, according to his Pat. #793,777, to subject them to repeated flash-over in the factory in order to develop maximum voltage rating.

5. Any reasonably skilled mechanic, and most engineers can readily make repairs to a compressed air condenser, if one should fail, but they would be helpless if a vacuum condenser failed.

6. The neutralizing condensers according to this invention are capable of being designed to simulate the internal capacity, inductance of leads, etc. in vacuum tubes far more readily than is the case of an open air condenser and therefore makes the neutralizing adjustment hold over a wider band of frequencies.

7. Even though compressed air condensers in small quantities cost more than open air condensers to manufacture, as to the original cost, the savings resulting from their use over a period of time greatly offsets the original cost many times over.

While only a few modifications of this invention have been disclosed, it is distinctly understood that condensers of this type are capable of other modifications. For example, a gear may be added to the adjusting nut 6 at the end of the condensers to permit varying the capacity by means of a shaft run at right angles to the axis of the condenser or in any other direction by providing some form of flexible coupling and suitable driving elements. Although condensers of the modifications described above are ordinarily designed to simulate the electrical characteristics of a vacuum tube, it is within the scope of this invention to vary the length of connections to the vacuum tube grid and those going to the neutralizing condenser to obtain a more exact balance over a wide range of frequencies.

We claim:

1. An electric condenser comprising an electrode in the form of a metallic casing, an insulating member supported by said casing, a second electrode secured to said insulating member so as to be spaced apart from said metallic casing, a portion of said second electrode being composed of an inner flexible metallic bellows acting as an air seal, an outer flexible metallic bellows arranged to have equal fluid pressure on all sides and to carry substantially all radio-frequency current, and a fluid under pressure interposed between said electrodes acting as the condenser dielectric.

2. An electric condenser for use in a radio frequency circuit comprising a casing, said casing acting as one electrode of the condenser, a central electrode having a variable length and located within said casing, adjusting means comprising a removable skirt to vary the size of said casing electrode, said removable skirt having a plurality of slots to shorten the path of said radio frequency circuit, the space between the electrodes within said casing being filled with a gas under pressure acting as a dielectric for said condenser.

3. An electric condenser comprising an electrode in the form of a metallic casing, an insulating member supported by said casing, a second electrode a portion of which is composed of a plurality of flexible metallic bellows, said second electrode secured to said insulator and spaced apart from said casing, and a removable element secured to the lower portion of said second electrode to vary the capacity of said condenser.

4. An electric condenser comprising an electrode in the form of a metallic casing, an adjustable sleeve within said casing, the lower portion of said sleeve having a tapered aperture, an insulating member supported by said casing, a second electrode a portion of which is flexible and another portion of which has a tapered plug substantially corresponding to the tapered aperture of said adjustable sleeve, said second electrode secured to said insulating member and spaced apart from said casing, and a dielectric of compressed fluid interposed between said electrodes.

5. An electric condenser comprising an electrode in the form of a metallic casing, an adjustable sleeve within said casing, the lower portion of said sleeve having a tapered aperture, external means for changing the position of said sleeve within said casing, an insulating member supported by said casing, a second electrode a portion of which is flexible and another portion of which has a tapered plug substantially corresponding to the tapered aperture of said adjustable sleeve, said second electrode secured to said insulator and spaced apart from said casing, and a dielectric of compressed fluid interposed between said electrodes.

6. A variable electric condenser comprising a metallic casing, said casing acting as one electrode of the condenser, an insulator supported by said casing, a central electrode within said casing having telescoping elements forming fixed and movable portions, a flexible metallic member secured to at least one end of each of said telescoping elements, the space between the electrodes being filled with a fluid under pressure acting as a dielectric for said condenser.

7. A variable electric condenser comprising an electrode in the form of a metallic casing, a removable sleeve located within the inner wall of said casing to vary the size of said casing electrode, an insulating member supported by said casing, a second electrode secured to said insulating member and spaced apart from said removable sleeve, said second electrode comprising a fixed and movable portion, a tubular flexible metallic member interposed between said fixed and movable portions of said second electrode, and means to vary the length of the flexible portion of said second electrode comprising a rigid member cooperating with an externally located adjusting member to vary the length of said second electrode from the outside of the casing, and a dielectric of compressed fluid interposed between said electrodes.

8. An electric condenser comprising an electrode in the form of a metallic casing, an insulating member supported by said casing, a second electrode secured to said insulating member so as to be spaced apart from said metallic casing, a portion of said second electrode being composed of two groups of concentrically arranged flexible metallic bellows for permitting variations in its length, and a dielectric of compressed fluid between said electrodes.

9. A variable condenser comprising an electrode in the form of a metallic casing, an insulating member supported by and secured to said casing, a second electrode secured to and supported by said insulating member so as to be spaced apart from said metallic casing and having fixed and movable portions, a tubular flexible metallic member interposed between said fixed and movable portions of said second electrode, means comprising a rigid member centrally located within said tubular flexible metallic member and cooperating with an externally located adjusting member to vary the length of said second electrode, and a dielectric of compressed fluid interposed between said electrodes.

10. A variable electric condenser comprising a metallic casing, said casing acting as one electrode of the condenser, an insulator supported by and secured to said casing, a central electrode secured to said insulator within said casing, said central electrode having fixed and movable portions comprising a plurality of flexible bellows interposed between and secured to said fixed portion and movable portion of said central electrode, means comprising a rod-like member centrally located within said flexible bellows and cooperating with an externally located adjusting member to vary the length of said central electrode, the space between the electrodes being varied with a gas under pressure acting as a dielectric for said condenser.

11. An electric condenser comprising an electrode in the form of a metallic casing, an insulating member supported by said casing, a second electrode secured to said insulating member so as to be spaced apart from said metallic casing, a portion of said second electrode being composed of an inner and an outer flexible metallic bellows for permitting variations in its length, and a dielectric of compressed fluid between the inner and outer flexible metallic bellows and the inner and outer electrodes.

12. A variable condenser comprising a fixed electrode and an adjustable electrode, said adjustable electrode comprising a fixed and a movable portion, a flexible metallic member interposed between said fixed and movable portions, said flexible member being subdivided into a plurality of corrugated flexible metallic bellows, a plurality of floating guide washers interposed between said corrugated flexible metallic bellows, and a fluid under pressure interposed between said fixed and adjustable electrodes acting as a dielectric for said condenser.

13. An electric condenser comprising an electrode in the form of a metallic casing, an insulating member supported by said casing, a second electrode secured to said insulating member so as to be spaced apart from said metallic casing, a portion of said second electrode being composed of an inner and an outer flexible metallic bellows for permitting variations in its length, said outer bellows being arranged to have equal fluid pressure on all sides, and a fluid under pressure interposed between said electrodes acting as the condenser dielectric.

14. A condenser especially adapted for high frequency circuits comprising a metallic casing having a cylindrical opening therein, an insulator carried by said casing, a fixed condenser element within said opening, a support carried by said insulator for supporting said fixed condenser element, a second adjustable condenser element, a tubular flexible metallic member interposed between the fixed and adjustable condenser elements, and means passing through said insulator and support for carrying said second condenser element and for adjusting the position of the second condenser element with respect to said fixed condenser element.

15. A condenser especially adapted for high frequency circuits comprising a metallic casing having a cylindrical opening therein, an insulator carried by said casing, a fixed condenser element within said opening, a support carried by said insulator for supporting said fixed condenser element, an adjustable condenser element within said casing, a tubular flexible metallic member secured to and interposed between the fixed and adjustable condenser elements, a sleeve surrounding said tubular flexible member, and means passing through said insulator and support for carrying said adjustable condenser element and for permitting variations in the position of said adjustable condenser element with respect to said fixed condenser element.

16. An electric condenser comprising a casing, said casing acting as one electrode of the condenser, a hollow cone-like insulator supported by said casing, a central electrode secured to said insulator having a plurality of flexible bellows for permitting variations in the length of said central electrode within said casing, adjusting means to vary the length of said central electrode, the space between the electrodes within said casing being filled with a gas under pressure acting as a dielectric for said condenser.

17. An electric condenser comprising a casing, said casing acting as one electrode of the condenser, a central electrode insulatedly secured within said casing, said central electrode having a fixed and a movable portion, a removable member with means for securing it to said movable portion of said central electrode to provide a physical change in the movable portion of said central electrode for substantially changing the capacity of the condenser, the space between the electrodes within said casing being filled with a gas under pressure acting as a dielectric for said condenser.

18. A variable condenser comprising an electrode in the form of a metallic casing, an insulating member supported by and secured to said casing, a second electrode secured to and supported by said insulating member so as to be spaced apart from said metallic casing and having fixed and movable portions in telescoping engagement, a tubular flexible metallic member interposed between said fixed and movable portions of said second electrode, means comprising a rigid member centrally located within said tubular flexible metallic member and cooperating with an externally located adjusting member to vary the length of said second electrode, and a dielectric of compressed fluid interposed between said electrodes.

19. An electric condenser comprising a casing acting as one electrode of the condenser having a valve, a pressure gauge, an insulator supported by said casing, a second electrode secured to said insulator and located centrally within said casing, said second electrode being divided into two portions, the lower portion being made flexible to vary its length by a flexible metallic member secured to the upper portion of said second electrode, threaded means to vary the length of said second electrode, and a dielectric of gas under pressure interposed between said electrodes.

20. A short wave variable electric condenser comprising a first electrode in the form of a metallic casing, an insulating member supported by and secured to said casing, a second electrode secured to and supported by said insulating member so as to be spaced apart from said metallic casing and having fixed and movable portions, a tubular flexible metallic member interposed between said fixed and movable portions of said second electrode, means comprising a rigid threaded rod-like member centrally located within said tubular flexible metallic member and cooperating with an externally located adjusting threaded member to vary the length of said second electrode, and a dielectric of compressed fluid interposed between said electrodes.

21. An electrical condenser comprising an electrode in the form of a metallic casing, said casing acting as one electrode of said condenser, an insulator supported by and secured to said casing, a central electrode secured to said insulator within said casing, said central electrode having fixed and movable portions comprising a plurality of flexible members interposed and secured to said fixed portion and movable portion of said central electrode, means comprising a threaded rod-like member centrally located within said flexible members and cooperating with an externally located threaded adjusting member to vary the length of said central electrode, the space between the electrodes being varied with a gas under pressure acting as a dielectric for said condenser, and a dielectric of compressed fluid interposed between said electrodes.

22. A variable condenser comprising a fixed electrode and an adjustable electrode, said adjustable electrode comprising a fixed and a movable portion, a flexible metallic member interposed between said fixed and movable portions, said flexible member being subdivided into a plurality of corrugated flexible metallic bellows, a plurality of guide rings interposed between and fixed to said corrugated flexible metallic bellows, and a fluid under pressure interposed between said fixed and adjustable electrodes acting as a dielectric for said condenser.

23. A condenser especially adapted for high frequency circuits comprising a metallic casing having an opening therein, an insulator carried by said casing, a fixed condenser element within said opening, a support carried by said insulator for supporting said fixed condenser element, an adjustable condenser element, a flexible metallic member interposed between the fixed and adjustable condenser elements, and means passing through said insulator and support for carrying said adjustable condenser element and for adjusting the position of the adjustable condenser element with respect to said fixed condenser element.

24. An electric condenser comprising a casing, said casing acting as one electrode of the condenser, a central electrode insulatingly secured within said casing, said central electrode having a fixed and a movable portion, a movable member with means for movably securing it to said movable portion of said central electrode to provide a physical change in the movable portion of said central electrode for substantially changing the capacity of the condenser, the space between the electrodes within said casing being filled with a gas under pressure acting as a dielectric for said condenser.

25. An electrical condenser comprising a metallic casing having an opening therein, an insulator carried by said casing, a fixed condenser element within said opening, a support carried by said insulator for supporting said fixed condenser element, an adjustable condenser element, a flexible metallic member interposed between the fixed and adjustable condenser elements, and means passing through said insulator and support for carrying said adjustable condenser element and for adjusting the position of the adjustable condenser element with respect to said fixed condenser element, and a dielectric of compressed fluid interposed between said electrodes.

26. An electrical condenser comprising a first electrode in the form of a tubular metallic casing, an insulating member supported by and secured to said casing, a second electrode secured to and supported by said insulating member so as to be spaced apart from said metallic casing and having fixed and movable portions, a tubular flexible metallic member interposed between said fixed and movable portions of said second electrode, means comprising a rigid member centrally located within said tubular flexible metallic member and cooperating with an externally located adjusting member to vary the length of said second electrode, and a dielectric of compressed fluid interposed between said electrodes.

27. An electric condenser comprising a casing, said casing acting as one electrode of the condenser, a central electrode having a variable length and located within said casing, adjusting means comprising a skirt arranged to be removable to vary the size of said casing electrode, the space between the electrodes within said condenser being filled with a gas under pressure acting as a dielectric of said condenser.

28. An electric condenser comprising a first electrode in the form of a metallic casing, an adjustable sleeve within said casing, a spring member within said casing, the upper portion of said sleeve having means to engage said spring, a first external means for changing the position of said sleeve within said casing, an insulating member supported by said casing, a second electrode located within said casing and supported by said insulator, said second electrode having a portion of which is flexible, and a second external means for changing the length of said second electrode to vary the capacity of said condenser, and a dielectric of compressed fluid interposed between said sleeve and said second electrode.

CLARENCE WESTON HANSELL.
GEORGE LINDLEY USSELMAN.
CHESTER WILLSON LATIMER.